United States Patent
Litch et al.

(10) Patent No.: US 10,169,256 B2
(45) Date of Patent: Jan. 1, 2019

(54) ARBITRATING DIRECT MEMORY ACCESS CHANNEL REQUESTS

(71) Applicant: Silicon Laboratories Inc., Austin, TX (US)

(72) Inventors: Timothy E. Litch, Dripping Springs, TX (US); Paul Zucker, Austin, TX (US); William G. Durbin, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 322 days.

(21) Appl. No.: 14/169,527

(22) Filed: Jan. 31, 2014

(65) Prior Publication Data

US 2015/0220460 A1  Aug. 6, 2015

(51) Int. Cl.
 *G06F 13/20* (2006.01)
 *G06F 13/16* (2006.01)
 *G06F 13/30* (2006.01)

(52) U.S. Cl.
 CPC .......... *G06F 13/1621* (2013.01); *G06F 13/30* (2013.01)

(58) Field of Classification Search
 CPC ...................................................... G06F 21/78
 See application file for complete search history.

(56) References Cited

U.S. PATENT DOCUMENTS

| 5,794,073 | A | * | 8/1998 | Ramakrishnan | ...... | G06F 13/364 710/22 |
| 6,651,119 | B2 | * | 11/2003 | Ghodrat | ................ | G06F 13/385 710/15 |
| 7,574,547 | B1 | * | 8/2009 | Avudaiyappan | ...... | G06F 13/364 370/395.42 |
| 2012/0290756 | A1 | | 11/2012 | Damodaran et al. | | |

FOREIGN PATENT DOCUMENTS

CN  1335562 A  2/2002

OTHER PUBLICATIONS

Office Action for Chinese Patent Application No. 2015100503556, dated Aug. 1, 2017, with English translation, 21 pages.

* cited by examiner

*Primary Examiner* — Henry Tsai
*Assistant Examiner* — Juanito Borromeo
(74) *Attorney, Agent, or Firm* — Trop, Pruner & Hu, P.C.

(57) ABSTRACT

A method includes receiving a plurality of requests to perform accesses for associated DMA channels and arbitrating the requests. The arbitration includes selectively granting a given request of the plurality of requests based at least in part on an associated fixed priority of the request and an associated priority weighting of the request. The priority weighting regulates which request or requests of the plurality of requests are considered at a given time.

21 Claims, 6 Drawing Sheets

ARBITRATING DIRECT MEMORY ACCESS CHANNEL REQUESTS

BACKGROUND

One way to communicate data between a system memory and a peripheral component of a computer system is for a central processing unit (CPU) to serve as an intermediary for the communication. For example, to transfer data from the system memory to the peripheral component, the CPU may perform the transfer by initiating the appropriate read operations to retrieve the data from the system memory and initiating the appropriate write operations to store the retrieved data in the memory of the peripheral component. For purposes of reducing CPU overhead, the computer system may employ direct memory access (DMA) in which a DMA engine of the peripheral component directly accesses the system memory to transfer the data.

SUMMARY

In an example embodiment, a method includes receiving a plurality of requests to perform accesses for associated DMA channels and arbitrating the requests. The arbitration includes selectively granting a given request of the plurality of requests based at least in part on an associated fixed priority of the request and an associated priority weighting of the request. The priority weighting regulates which request or requests of the plurality of requests are considered at a given time.

In another example embodiment, an apparatus includes an arbiter and a plurality of direct memory access (DMA) engines that are associated with DMA channels. Each DMA channel is associated with a fixed priority and a priority weighting. The arbiter arbitrates requests from the DMA engines to perform DMA accesses for the associated DMA channels. The arbiter is adapted to arrange the requests for consideration in a sequence of arbitration slots based at least in part on the priority weightings and traverse the sequence of arbitration slots in an arbitration cycle that considers the request or requests in each arbitration slot to selectively grant the requests based at least in part on the fixed priorities associated with the requests.

In yet another example embodiment, an apparatus includes an integrated circuit (IC) that includes direct memory access (DMA) channels and a DMA channel arbiter. The arbiter is adapted to receive requests for use of the DMA channels, each request being associated with a priority weighting and a priority; arrange the requests in arbitration slots based at least in part on the associated priority weightings; traverse the sequence of arbitration slots; and in response to a given slot containing multiple requests, select an arbitration winner based on the priorities of the multiple requests.

Advantages and other desired features will become apparent from the following drawings, description and claims.

DETAILED DESCRIPTION

Figure 1:
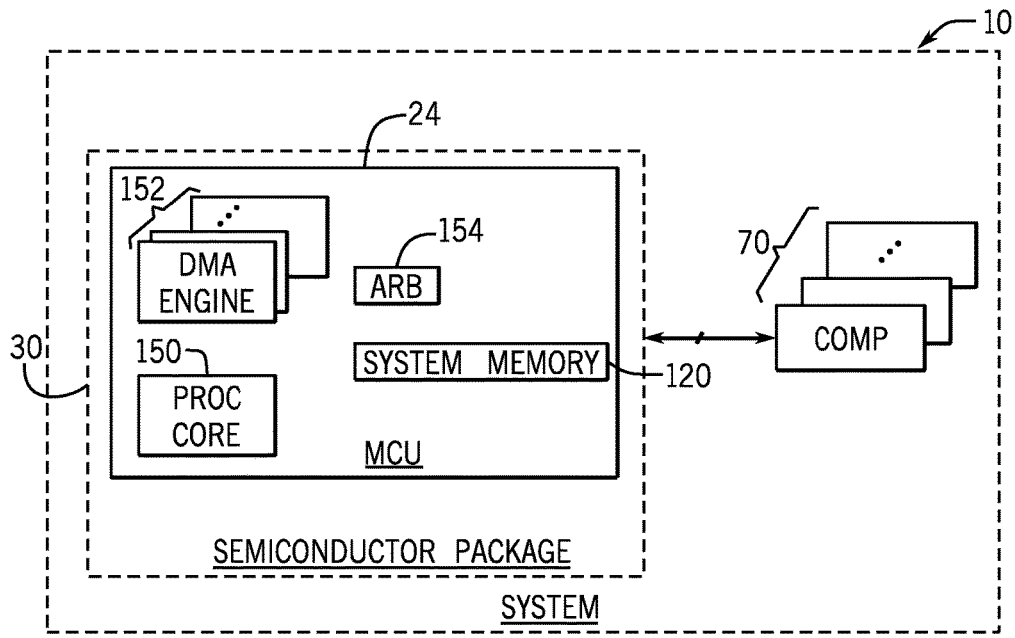
FIG. 1 is a schematic diagram of a microcontroller unit (MCU)-based system according to an example embodiment.

A given computer system may include multiple direct memory access (DMA) channels, which are used by DMA engines of the system to transfer (via associated "DMA transfers") data to and from a system memory. To perform a DMA transfer, a DMA engine may assert a DMA request line to correspondingly submit a request to access a DMA channel (called a "DMA channel request" herein) to an arbitration controller, or arbiter, of the computer system; and after the arbiter grants the request by asserting a DMA grant line for the requested channel, the DMA engine is allowed to access a system bus and perform the DMA transfer. The system bus may be a shared resource of the computer system and may support a single DMA transfer (as an example) at a given time. Because, at any given time, multiple DMA channel requests may be pending, the arbiter may apply an arbitration policy for purposes of selecting which pending request to grant.

The arbiter may apply a fixed priority arbitration policy to select a pending DMA channel request from multiple pending requests. Fixed priority arbitration relies on the DMA channels being assigned different priority levels, and the arbiter grants the pending request that has the highest fixed priority, i.e., the pending request that is associated with the DMA channel that has the highest fixed priority. A particular advantage of a fixed priority arbitration policy is that a relatively low latency DMA channel (i.e., a DMA channel having a relatively higher fixed priority) may be serviced more frequently than a relative high latency DMA channel (i.e., a DMA channel having a relatively lower fixed priority).

A round robin arbitration policy is another type of arbitration in which the arbiter cycles through pending DMA channel requests in a circular sequence of arbitration slots, where each slot is assigned to a different DMA channel. As the arbiter cycles through the sequence from one considered arbitration slot to the next, the arbiter grants a given pending request if the request is associated with a DMA channel that is assigned to the currently considered arbitration slot. A particular advantage of a round robin priority arbitration policy is that a requestor for a relatively high latency DMA channel, which may otherwise have a relatively low fixed priority in a fixed priority arbitration scheme, is not "starved out" by lower latency requestors.

Example systems and techniques are disclosed herein, which employ an arbitration policy that has aspects of both fixed priority-based arbitration and round robin-based arbitration. More specifically, in accordance with this arbitration policy, the DMA channels are assigned fixed priorities and priority weightings: no two DMA channels share the same fixed priority, but multiple DMA channels may have the same priority weighting. DMA requests are grouped, or arranged, in arbitration slots of a circular sequence of arbitration slots (a round robin sequence of arbitration slots, for example) based on the priority weightings. In this manner, in accordance with example embodiments, the priority weighting that is assigned to a given DMA channel controls the number of arbitration slot(s) in which requests for the DMA channel may appear. The arbiter cycles through the circular sequence of arbitration slots, considering one arbitration slot at a given time; and for a given arbitration slot, the arbiter selects the pending request for that slot, which has the highest fixed priority.

In accordance with example embodiments, requests that correspond to similar fixed priority DMA channels are grouped together so that the DMA channel requests that are associated with lower fixed priorities are not dominated, or starved out, by DMA channel requests that are associated with higher fixed priorities. Moreover, the DMA channel requests that are associated with higher fixed priorities are assigned to more arbitration slots so that these requests may be adequately serviced. Therefore, in example embodiments, requests for DMA channels that are associated with relatively high latencies and relatively low fixed priorities may be grouped together in the same arbitration slots but appear in relatively few arbitration slots; and requests for DMA channels that are associated with relatively low latencies and relatively higher fixed priorities are also grouped together in the same arbitration slots to compete against each, but these requests appear in more arbitration slots. Among the possible advantages of the arbitration policy is that relatively infrequent, low latency requestors are allocated some share of the DMA transfers, while relatively frequent, high latency requestors may preempt the low latency requestors at intervals throughout the arbitration cycle.

As a more specific example, FIG. 1 depicts an MCU 24 in an example system 10. For this example, the MCU 24 controls various aspects of one or multiple components 70 in response to communications with the component(s) 70. As examples, the components 70 may include one of more of the following depending on the particular application: an electrical motor, a household appliance, an inventory control terminal, a computer, a tablet, a smart power meter, a wireless interface, a cellular interface, an interactive touch screen user interface, a flow sensor, and so forth. All or part of the components of the MCU 24 may be part of a semiconductor package 30.

As depicted in FIG. 1, the MCU 24, in accordance with example embodiments, includes hardware-based DMA engines 152, which may be memory interfaces for peripheral component (network interfaces, wireless interfaces, general purpose input/output (GPIO) interfaces, and so forth) of the MCU 24. A given DMA engine 152 may perform various DMA transfers within the MCU 24. A given DMA transfer may be, as examples, a transfer from a memory of the peripheral component containing the DMA engine 152 to a system memory of the MCU 24; a transfer from the system memory to the memory of the peripheral component; an immediate write operation between system memory locations; or a peripheral-to-peripheral transfer. An arbiter 154 performs the above-described arbitration of DMA requests.

In accordance with example embodiments, the MCU 24 includes a system memory 120. The system memory 120 is associated with the main memory for the MCU 24 and may store, as examples, the DMA descriptors, packet data, program variables, data structures, images, and so forth. The MCU 24 may also contain an I/O memory that, in general, refers to the memory space (register addresses) of the peripherals of the MCU 24.

Figure 2:
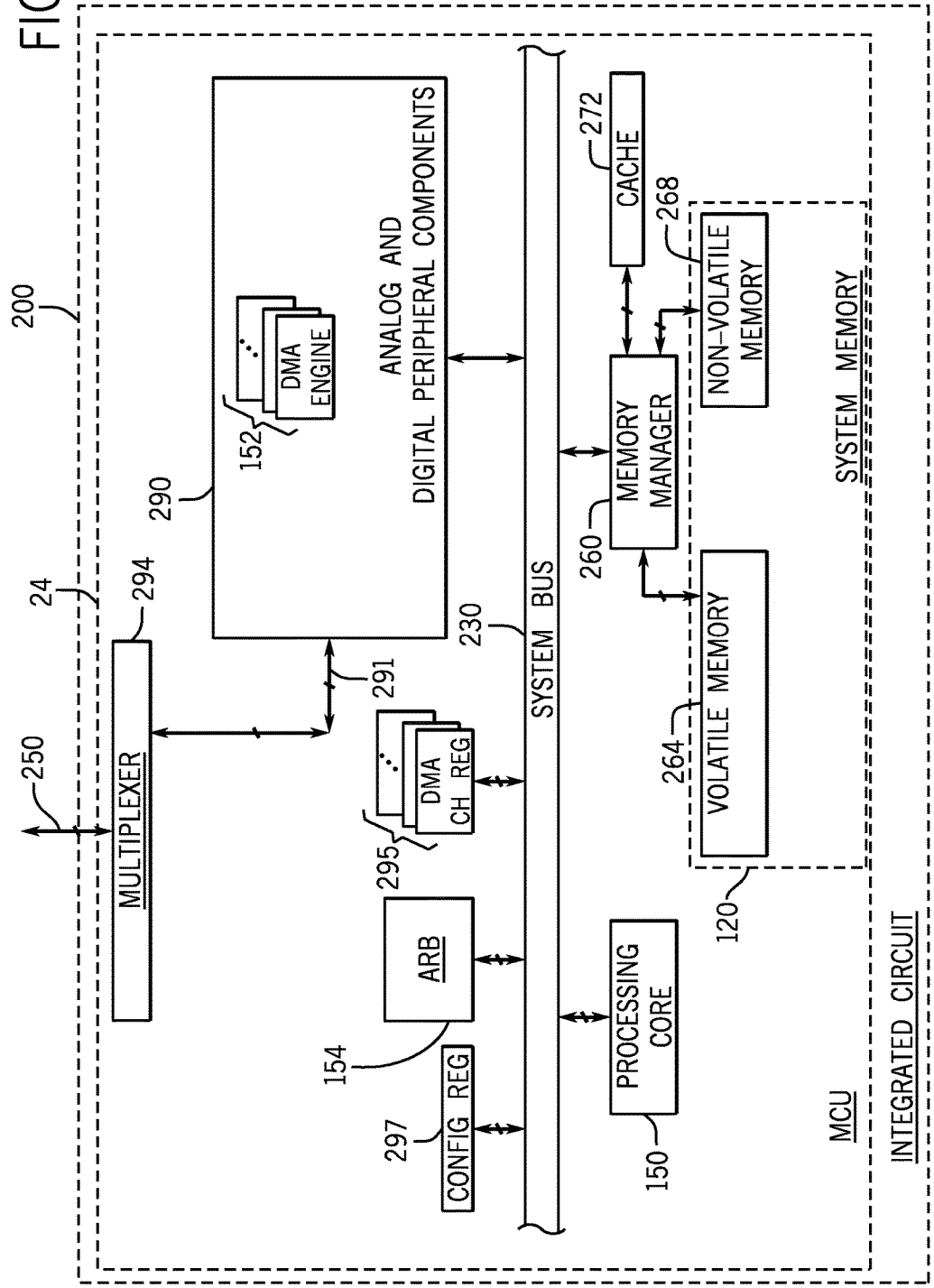
FIG. 2 is a schematic diagram of an MCU of the system of FIG. 1 according to an example embodiment.

Referring to FIG. 2, in accordance with some embodiments, all or part of the components of the MCU 24 may be part of an integrated circuit (IC) 200. As examples, all or part of the components of the MCU 24 may be fabricated on a single die or on multiple dies. The integrated circuit 200 may be packaged to form the semiconductor package 30 (see FIG. 1).

Among its components, the MCU 24 includes the processing core 150, the DMA engines 152 and the arbiter 154. Depending on the particular embodiment, the MCU 24 may not contain any of the components depicted in FIG. 2 other than the processing core 150 and the arbiter 154, and the DMA engines 152; may contain one or more of the components that are depicted in FIG. 2 in addition to the processing core 150 and the DMA engines 152 and the arbiter 154; may contain other and/or additional components than the components that are depicted in FIG. 2; and so forth. Thus, many embodiments are contemplated, which are within the scope of the appended claims.

The arbiter 154 is coupled to DMA channel request and grant lines associated with a system bus 230 of the MCU 24 for purposes of receiving and selectively granting DMA channel requests. Depending on the particular embodiment, the arbiter 154 may be a state machine and may be constructed using hardwired circuitry, a processing core that executes instructions, a combination of a processing core and hardwired circuitry, and so forth.

As an example, the processing core 150 may be a 32-bit core, such as the Advanced RISC Machine (ARM) processing core, which executes a Reduced Instruction Set Computer (RISC) instruction set. In general, the processing core 150 communicates with various other system components of the MCU 24, such as a memory controller, or manager 260, over a system bus 230. In general, the memory manager 260 controls access to various memory components of the MCU 24, such as a cache 272, a non-volatile memory 268 (a Flash memory, for example) and a volatile memory 264 (a static random access memory (SRAM), for example). As depicted in FIG. 2, the volatile memory 264 and the non-volatile memory 268 may form the system memory 120 of the MCU 24. In other words, the volatile memory 264 and the non-volatile memory 268 have memory locations that are part of the system memory address space for the MCU 24.

It is noted that FIG. 2 depicts a block diagram representation of the MCU architecture, as the MCU 24 may have many other components, bridges, buses, and so forth, in accordance with other exemplary embodiments. For example, in accordance with some embodiments, the MCU 24 may have a bus matrix module that implements slave side arbitration and is used to regulate access to the memory devices of the MCU 24.

In accordance with some embodiments, the MCU 24 includes analog and digital components 290, which communicate analog and digital signals with I/O terminals 291. The MCU 24 may further contain a multiplexer 294 that allows the programmable assignment of these signals to inputs/outputs (I/Os) of the MCU 24. The analog components may include various components that receive analog signals, such as analog-to-digital converters (ADCs) and comparators; and the MCU 24 may contain analog components that provide analog signals, such as current drivers. The digital components of the MCU 24 may include, as examples, a Universal Serial Bus (USB) interface, a universal asynchronous receiver/transmitter (UART), a system management bus interface (SMB), a serial peripheral interface (SPI), a clock generator module, programmable timers and so forth.

Figure 3A:
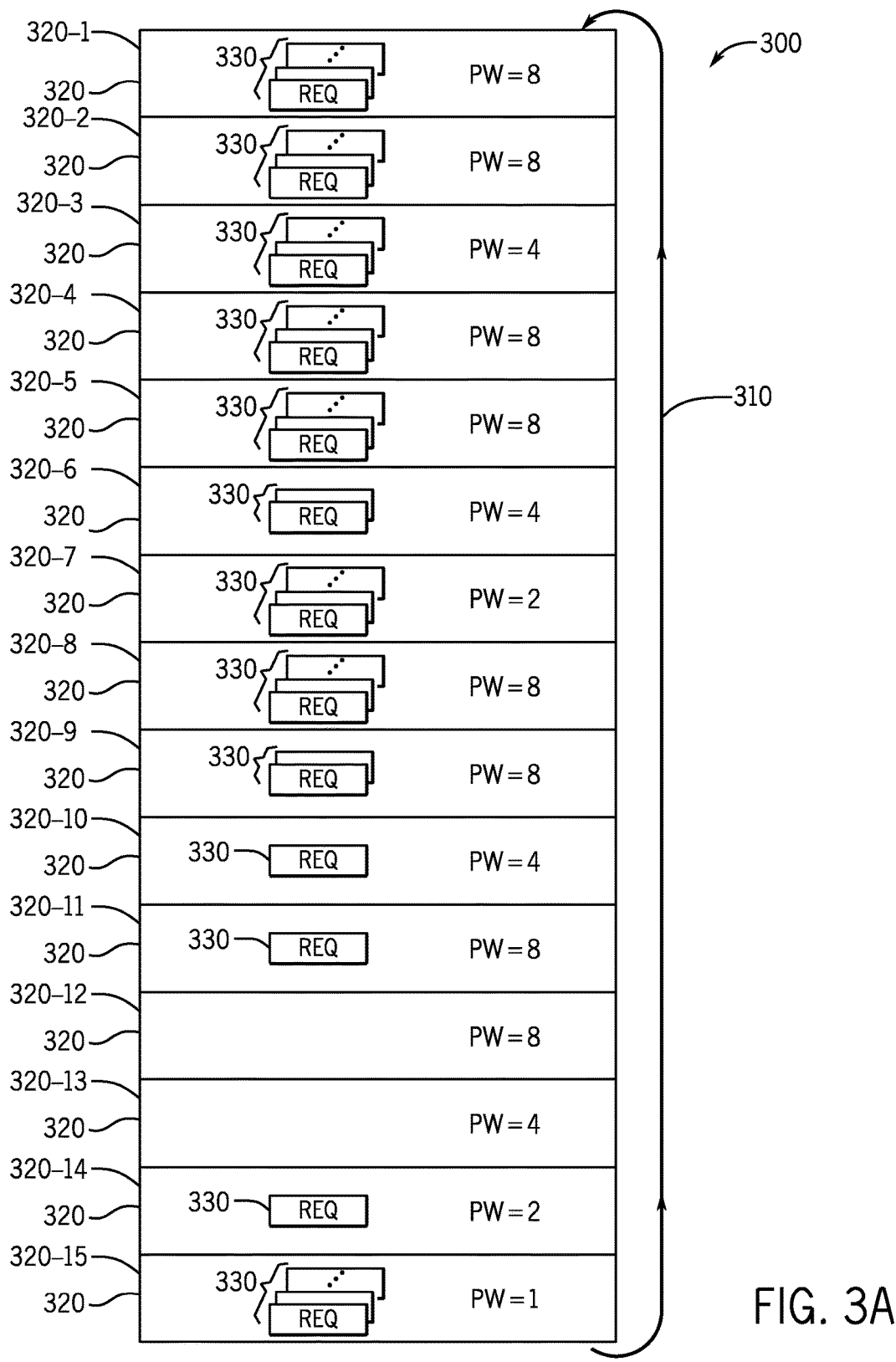
FIG. 3A is an illustration of an arbitration scheme used by an arbiter of the MCU of FIG. 2 according to an example embodiment.

In accordance with example embodiments, the arbiter 154, which employs an arbitration scheme based on round robin and fixed priority arbitration for purposes of arbitrating DMA channel requests. FIG. 3A depicts an illustration 300 of this arbitration. Referring to FIG. 3A in conjunction with FIG. 2, the arbiter 154 arranges pending DMA channel requests 330 in corresponding arbitration slots 320, which the arbiter 154 considers in a circular sequence (as depicted by direction 310) for purposes of evaluating and selectively granting the pending requests 330. Each DMA channel has an assigned fixed priority and an assigned priority weighting. Therefore, a DMA request 330 for a given DMA channel has an associated fixed priority and an associated priority weighting.

In accordance with example embodiments, the arbiter 154 populates, or arranges, the requests 330 in the arbitration slots 320 based on the priority weightings associated with the requests 330. In general, multiple requests 330 may be associated with the same priority weighting so that requests 330 that are associated with similar fixed priorities are grouped together. The priority weightings further control the number of arbitration slots 320 in which requests for a given DMA channel may appear in the cycle.

As a more specific example, in accordance with example embodiments, the priority weightings are as follows: 8, 4, 2 or 1. If a given DMA channel is assigned a priority weighting of "8," then the DMA channel is assigned to eight arbitration slots of the arbitration cycle. In a similar manner, if a given DMA channel is assigned a priority weighting of "4," "2," or "1," then the DMA channel is assigned four, two or one arbitration slots 320, respectively, of the arbitration cycle.

For the example embodiment of FIG. 3A, the highest fixed priority DMA channels are each assigned priority weighting of "8," and the lowest fixed priority DMA channels are each assigned a priority weighting of "1." In this manner, as depicted in FIG. 3A, a priority weighting (called "PW" in FIG. 3A) of "8" means that requests 330 for DMA channels having priority weightings of "8" are considered in the eight arbitration slots 320-1, 320-2, 320-4, 320-5, 320-8, 320-9, 320-11 and 320-12. A priority weighting of "4" means that requests 330 for DMA channels having this weighting appears in four arbitration slots 320; and so forth.

For this specific example, the arbitration cycle contains fifteen arbitration slots 320, i.e., 8+4+2+1. However, it is noted that in accordance with further example embodiments, the assigned priority weighting may not necessarily have a one-to-one correspondence with the number of assigned arbitration slots 320.

Thus, the arbiter 154 groups the pending DMA channel requests 330 into the arbitration slots 320 based on the priority weightings associated with the requests 330; and the arbiter 154 traverses the arbitration slots 320 in a circular order, or sequence, for purposes of selecting a pending request 330 (if any) for each slot 320.

For purposes of selecting a pending request 330 from multiple pending requests 330 for a given arbitration slot 320, the arbiter 154 considers the fixed priorities of the requests 330. In this manner, in accordance with example embodiments, each request 330 has a fixed priority that is assigned based on the associated DMA channel. For example, in accordance with some embodiments, a set of fixed priorities that correspond to the DMA channel numbers are used. For eight DMA channels, the highest fixed priority (a fixed priority of "0") is assigned to a pending request 330 for DMA channel 0, and the lowest fixed priority (a fixed priority of "7") is assigned to a pending request 330 for DMA channel 7. In accordance with further example embodiments, the fixed priorities may share the opposite ordering or some other ordering with respect to the DMA channel numbers.

Figure 3B:
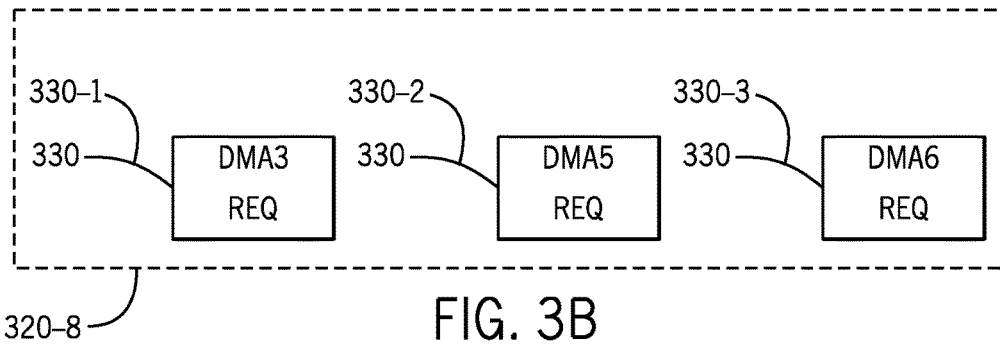
FIG. 3B is an illustration of an arbitration slot according to an example embodiment.

For a given arbitration slot 320, multiple pending requests 330 that have different fixed priorities may be considered by the arbiter 154 for purposes of selecting and granting one of the requests 330. As a more specific example, FIG. 3B depicts multiple pending requests 330 for example arbitration slot 320-8: a pending request 330-1 associated with DMA channel 3; a pending request 330-2 associated with DMA channel 5; and a pending request 330-3 associated with DMA channel 6. For this example, the arbiter 154 selects the highest fixed priority, or pending request 330-1 (assuming that the lowest associated DMA channel has the highest fixed priority).

Therefore, to begin the arbitration cycle of FIG. 3A, the arbiter 154 initially evaluates the pending requests 330 associated with the arbitration slot 320-1, which is associated with priority weighting of "8." The arbiter 154 grants the highest priority request 330 evaluated in the arbitration slot 320-1 and proceeds to evaluate requests 330 having a priority weighting of 8 in the next arbitration slot 320-2, in accordance with the direction 310. It is noted that the requests 330 evaluated in the arbitration slot 320-2 are the same requests 330 evaluated in the arbitration slot 320-1, except for the granted request 330, which has been removed. After granting the highest priority pending request 330 pending in the arbitration slot 320-2, the arbiter 154 next considers pending requests 330 in the next arbitration slot 320-3.

As shown in FIG. 3A, the arbitration slot 320-3 has an associated priority weighting of "4." Therefore, the arbiter 154 in the arbitration slot 320-3 evaluates all pending requests 330 having a priority weighting of "4" to grant the pending requests 330, which has the highest priority. The granted request 330 is then removed so that when the arbiter 154 next considers the priority weighting of four requests 330 in the arbitration slot 320-6, the previously-granted request 330 from arbitration slot 320-3 is not considered.

The above-described arbitration cycle continues, as the arbiter 154 considers the request(s) 330 from one arbitration slot 320 to the next. After considering any pending request(s) 330 in the arbitration slot 320-15, the arbitration cycle repeats, and the arbiter 154 considers any pending requests in the arbitration slot 320-1. Depending on the particular embodiment, the arbiter 154 may or may not allow updating of pending requests until a given cycle finishes. In this manner, depending on the particular embodiment, the arbiter 154 may update a queue containing pending DMA channels requests once, multiples times, or whenever pending requests are received.

It is noted that a given arbitration slot 320 may not be associated with any pending DMA channel requests 330. For example, for the arbitration slot 320-11 of FIG. 3A, which is associated with a priority weighting of "8," the arbiter 154 considers one request 330. The arbiter 154 therefore selects the request 330, thereby leaving, for this example, no request for the next arbitration slot 320-12 also associated with a priority weighting of "8."

Figure 4C:
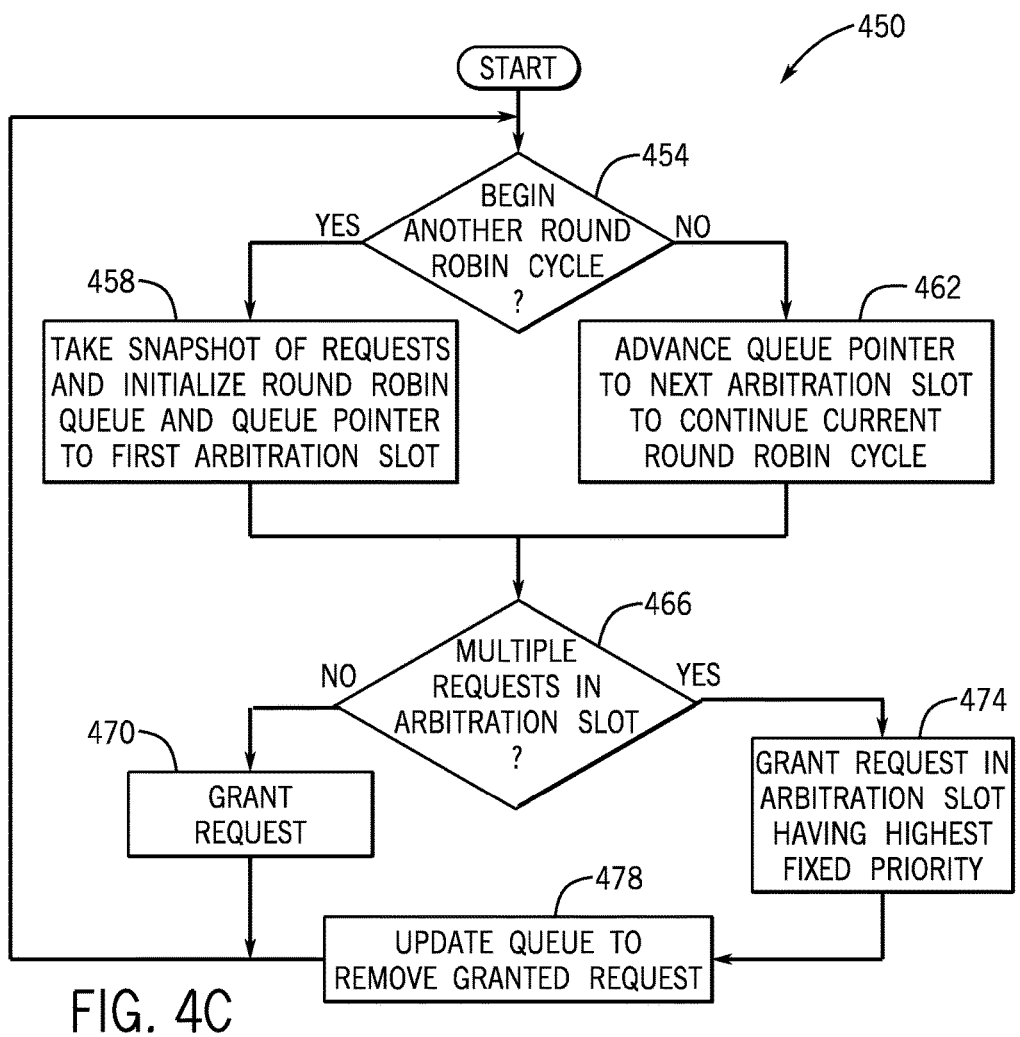
FIGS. 4A, 4B and 4C are flow diagrams depicting techniques to arbitrate direct memory access (DMA) channel requests according to example embodiments.
Figure 4A:
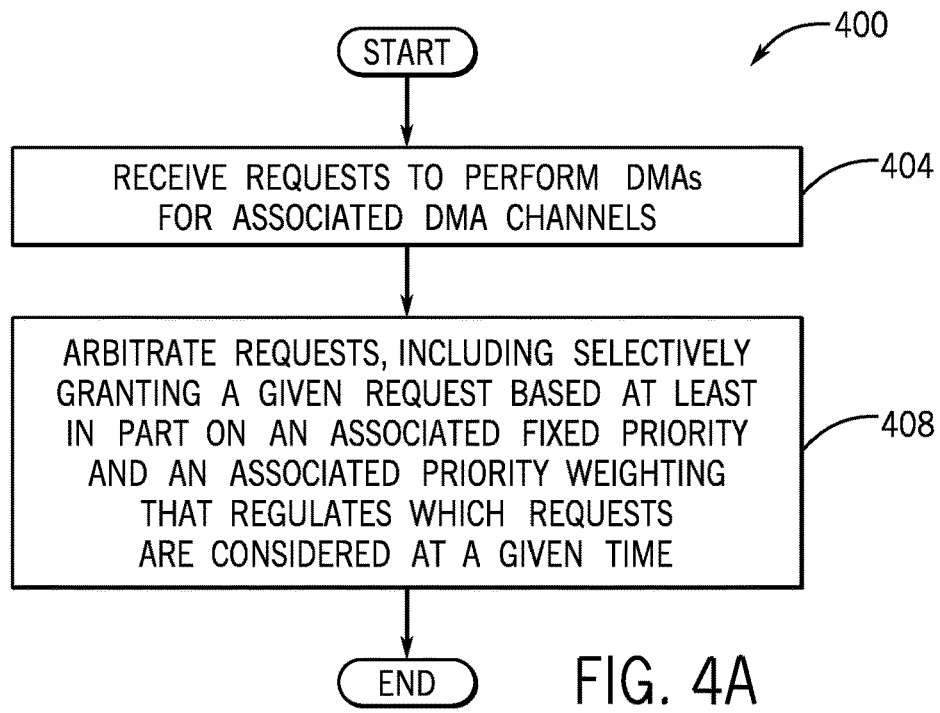

Thus, in general, the arbiter 154 may perform a technique 400 that is depicted in FIG. 4A. Referring to FIG. 4A in conjunction with FIG. 2, pursuant to the technique 400, the arbiter 154 receives (block 404) requests to perform direct memory accesses (DMAs) for associated DMA channels. The arbiter 154 arbitrates (block 408) the requests, including selectively granting a given request based at least in part on an associated priority of the request and an associated weighting of the request, which regulates which requests are considered at a given time.

Figure 4B:
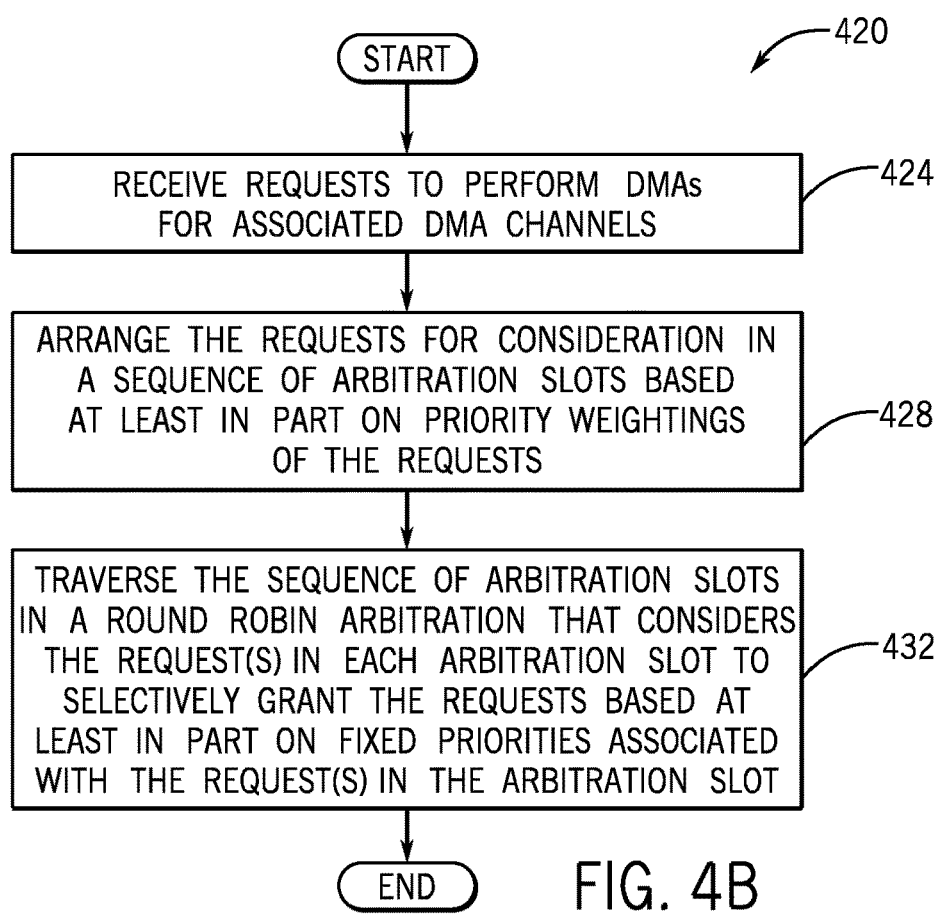

As described above, in accordance with some embodiments, the arbitration may be an arbitration scheme based at least in part on round robin arbitration. Therefore, the arbiter 154 may perform a technique 420 that is depicted in FIG. 4B. Referring to FIG. 4B in conjunction with FIG. 2, in accordance with example embodiments, the arbiter 154 receives (block 424) requests to perform DMA transfers for associated DMA channels and arranges (block 428) these requests for consideration in a sequence of arbitration slots based at least in part on priority weightings of the requests. The arbiter 154 traverse the sequence of arbitration slots in a round robin arbitration that considers the request(s) in each arbitration slot to selectively grant the requests based at least in part on fixed priorities associated with the requests, pursuant to block 432.

As a more specific example, the arbiter 154 may perform a technique 450 that is depicted in FIG. 4C in traversing the round robin queue of arbitration slots. Referring to FIG. 4C in conjunction with FIG. 2, pursuant to the technique 450, the arbiter 154 determines (decision block 454) whether to begin another round robin cycle. If not, in accordance with example embodiments, the arbiter 154 takes a snapshot of the currently pending requests and initializes the round robin queue and initializes the queue pointer to point to the first arbitration slot of the round robin queue, pursuant to block 458. As noted above, in accordance with further example embodiments, the arbiter 154 may allow the round robin queue to be updated whenever a new request is received, in accordance with further example embodiments. If the arbiter 154 determines (decision block 454) that the arbiter 154 has not traversed the round robin queue in the current round robin cycle, the arbiter 154 advances (block 462) the queue pointer to the next arbitration slot to continue the current round robin cycle.

The arbiter 154 processes the request(s) associated with a given arbitration slot as follows. If the arbiter 154 determines (decision block 466) that multiple requests are in the associated with the same arbitration slot, then the arbiter 154 grants (block 474) the pending request in the arbitration slot that has the highest fixed priority and updates (block 478) the round robin queue to remove the granted request. Otherwise, if the arbiter 154 determines (decision block 466) that a single request is in the associated arbitration slot, the arbiter 154 grants the request, pursuant to block 470. Control then returns to decision block 454 for purposes of initializing another round robin cycle or processing the next arbitration slot in a given round robin cycle, as described above.

Figure 5A:
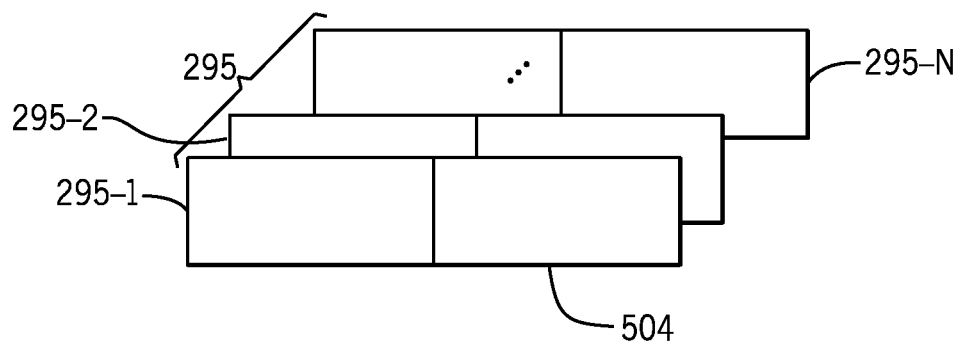
FIG. 5A illustrates DMA channel configuration registers according to an example embodiment.

Referring to FIG. 5A in conjunction with FIG. 2, in accordance with example embodiments, the MCU 24 contains DMA channel configuration registers 295. Each register 295 is associated with a particular DMA channel and includes a bit field 504 that contains data that represents the priority weighting of the associated DMA channel. As noted above, the fixed priorities of the DMA channels may be a function of the DMA channel numbers, in accordance with example embodiments. More specifically, as depicted in FIG. 5A, the DMA channel configuration registers 295 may contain N registers 295 for N respective DMA channels, and the bit field 504 of each register 295 may specify whether the associated priority weighting is 1, 2, 4 or 8 (as an example).

Figure 5B:
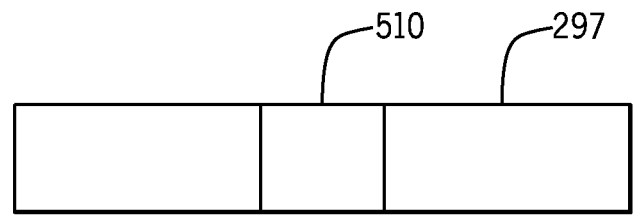
FIG. 5B illustrates a configuration register of the MCU according to an example embodiment.

Referring to FIG. 5B in conjunction with FIG. 2, in accordance with example embodiments, a configuration register 297 of the MCU 24 may contain a bit field 510 specifying the type of arbitration to be used by the arbiter 154 for arbitrating DMA channel requests. As an example, in accordance with some embodiments, the bit field 510 may contain certain data value (a "0" bit for example) to disables the above-described fixed priority and round robin-base arbitration policy and instead establish a fixed priority arbitration scheme for the arbiter 154; and may contain another value (a "1" bit, for example) to enable the fixed priority and round robin-based arbitration policy.

Figure 6:
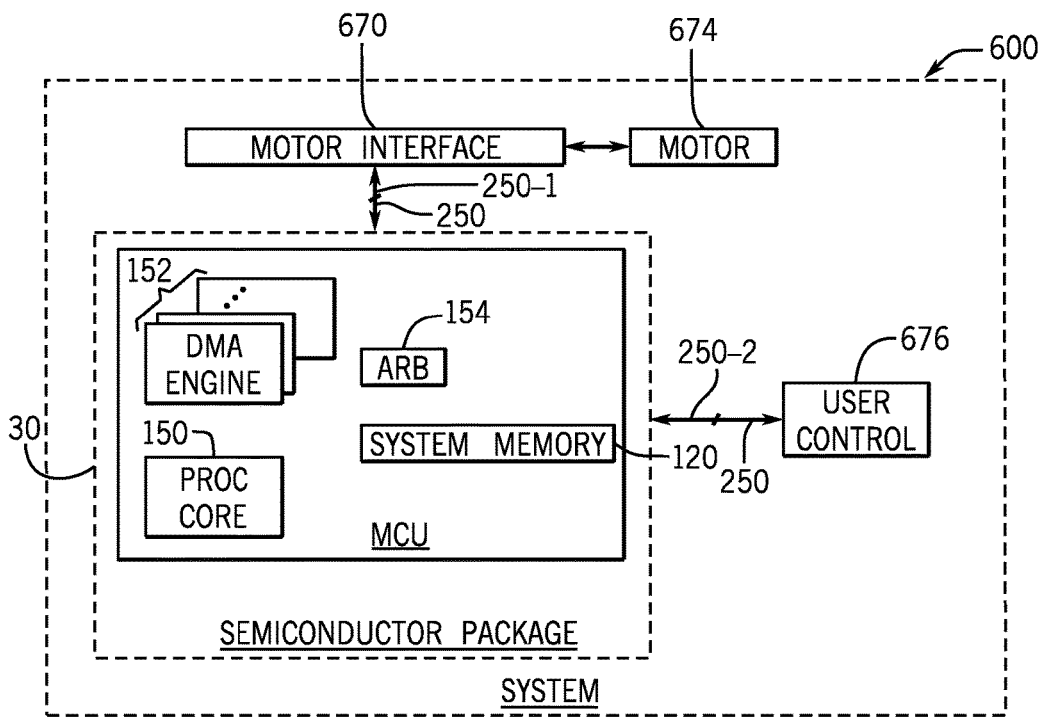
FIG. 6 is a schematic diagram of an MCU-based system according to an example embodiment.

Referring to FIG. 6, in accordance with some embodiments, the MCU 24 may be part of a system 600 to control a motor 674. In this manner, the MCU 24 may generate/receive input and output signals (I/O signals) in connection with the control of a motor interface 670 that generates and receives signals in connection with operating the motor 674. For example, the MCU 24 may generate signals at its I/O terminals 250-1 for purposes of communicating with drivers, sensors, and so forth of the motor interface 670; and in connection with this communication; and the I/O terminals 250-1 may communicate waveforms (pulse width modulation (PWM) signals, for example), receive sensed currents and voltages, communicate data via one or more serial buses, and so forth. Other I/O terminals 250-2 of the MCU 24 may generate/receive signals to communicate with a user control interface 676 for such purposes as communicating status of the motor 674 and motor interface 670; communicating detected fault conditions; receiving user-directed commands and signals; and so forth.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
   receiving a plurality of requests to perform accesses for associated DMA channels, each request being associated with a fixed priority and each request being associated with a priority weighting, wherein at least a first priority weighting of the associated priority weightings is different from a second priority weighting of the priority weightings; and
   arbitrating the requests, the arbitrating comprising, for a given request of the plurality of requests:
      identifying a number of arbitration slots in an arbitration cycle based at least in part on the priority weighting assigned to the given request;
      assigning at least one arbitration slot in the arbitration cycle to the given request such that the identified number of arbitration slots is or are assigned to the given request, wherein the at least one arbitration slot comprises an arbitration slot concurrently assigned to both the given request and to another request of the plurality of requests; and
      sequencing through the slots in the arbitration cycle, comprising for the arbitration slot concurrently assigned to both the given request and to the another request, selectively granting the given request based at least in part on the associated fixed priority of the given request and the associated fixed priority of the another request.

2. The method of claim 1, wherein arbitrating the requests comprises:
   selecting a priority weighting; and
   selecting the given request from at least one request of the plurality of requests having the associated priority weighting.

3. The method of claim 2, wherein a group of at least two of the requests each have the selected associated priority weighting, the requests of the group having different associated fixed priorities, and selecting the granted request comprises selecting the request of the group having the higher associated fixed priority.

4. The method of claim 1, wherein the fixed priorities are set by priority assignments for the associated DMA channels.

5. The method of claim 1, wherein the arbitrating comprises arbitrating based at least in part on arbitration slots associated with the priority weightings.

6. An apparatus comprising:
a plurality of direct memory access (DMA) engines associated with DMA channels, each DMA channel being associated with a fixed priority and a priority weighting, wherein at least a first priority weighting of the associated priority weightings is different from a second priority weighting of the priority weightings; and
an arbiter to arbitrate requests from the DMA engines to perform DMA accesses for the associated DMA channels, wherein:
the arbiter is adapted to arrange the requests for consideration in a sequence of arbitration slots based at least in part on the priority weightings;
a given DMA channel of the DMA channels is associated with a given request of the requests from the DMA engines;
the arbiter is adapted to assign a number of the arbitration slots to the given request based on the priority weighting of the DMA channel associated with the given request;
a given arbitration slot of the number of arbitration slots assigned to the given request is concurrently assigned to another request of the requests; and
the arbiter is adapted to traverse the sequence of arbitration slots in an arbitration cycle that considers the request or requests in each arbitration slot to selectively grant the requests, wherein the selectively granting of the requests comprises selectively granting the request associated with the given arbitration slot based on the fixed priority associated with the another request and the fixed priority associated with the given request.

7. The apparatus of claim 6, wherein the arbiter is adapted to cycle through the sequence of arbitration slots and restrict updating the sequence to occur one time per cycle.

8. The apparatus of claim 6, wherein the arbiter is adapted to cycle through the sequence of arbitration slots and allow the sequence to be updated more than one time per cycle.

9. The apparatus of claim 6, further comprising:
at least one register to store the priority weightings for the DMA channels.

10. The apparatus of claim 6, wherein the priority weightings comprises a first priority weighting associated with a first number of the slots and a second priority weighting associated with a second priority weighting associated with a second number of the slots different from the first number of slots.

11. The apparatus of claim 6, wherein the arbitration cycle comprises a round robin arbitration cycle.

12. The apparatus of claim 6, wherein each priority weighting identifies a number of arbitration slots processed by the arbiter in the arbitration cycle.

13. The apparatus of claim 6, wherein all of the fixed priorities are different from each other.

14. The apparatus of claim 6, wherein the fixed priorities are assigned based on DMA channel numbers.

15. An apparatus comprising:
an integrated circuit (IC) comprising direct memory access (DMA) channels and a DMA channel arbiter, wherein the arbiter is adapted to:
receive requests for use of the DMA channels, each request being associated with a priority weighting and a priority, wherein at least a first priority weighting of the associated priority weightings is different from a second priority weighting of the priority weightings;
assign the requests in arbitration slots based on the associated priority weightings such that a number of the arbitration slots assigned to a given request of the requests is based on the associated priority weighting for the given request;
traverse the sequence of arbitration slots to select an arbitration winner for each arbitration slot of the arbitration slots; and
in response to a given slot of the arbitration slots being concurrently assigned to multiple requests, select the arbitration winner for the given slot based on the priorities of the multiple requests.

16. The apparatus of claim 15, wherein the priority weightings comprises a first priority weighting associated with a first number of the slots and a second priority weighting associated with a second priority weighting associated with a second number of the slots different from the first number of slots.

17. The apparatus of claim 15, wherein each priority weighting identifies a number of assigned arbitration slots.

18. The apparatus of claim 15, wherein the arbiter is adapted to consider the requests in the arbitration slots based on the associated priority weightings such that the arbiter is adapted to consider multiple pending requests having the same priority weighting.

19. The apparatus of claim 15, wherein the arbiter is adapted to traverse the arbitration slots in a circular sequence.

20. The method of claim 1, wherein a set of requests of the plurality of requests are associated with a given priority weighting of the associated priority weightings, and the requests of the set of requests are associated with different fixed priorities.

21. The apparatus of claim 6, wherein a set of requests of the requests from the DMA engines are associated with a given priority weighting of the associated priority weightings, and the requests of the set of requests are associated with different fixed priorities.

* * * * *